United States Patent
Harris et al.

(10) Patent No.: US 7,330,733 B2
(45) Date of Patent: Feb. 12, 2008

(54) METHOD AND APPARATUS FOR REDUCING PAGING-RELATED DELAYS FOR ANTICIPATED TARGET MOBILE STATIONS

(75) Inventors: John M. Harris, Chicago, IL (US); Ronald T. Crocker, St. Charles, IL (US); Sean S. Kelley, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 526 days.

(21) Appl. No.: 10/614,839

(22) Filed: Jul. 8, 2003

(65) Prior Publication Data
US 2005/0009547 A1    Jan. 13, 2005

(51) Int. Cl.
*H04B 7/00* (2006.01)
(52) U.S. Cl. ............ 455/518; 455/519; 370/312
(58) Field of Classification Search .......... 455/422.1, 455/445, 417, 69, 519, 67.16, 453, 515, 518; 370/328, 491, 412
See application file for complete search history.

(56) References Cited

U.S. PATENT DOCUMENTS

| 5,442,809 | A | * | 8/1995 | Diaz et al. ............ 455/511 |
| 5,511,110 | A | * | 4/1996 | Drucker ............... 455/458 |
| 5,822,700 | A | | 10/1998 | Hult et al. |
| 5,907,810 | A | | 5/1999 | Subramanian et al. |
| 6,035,203 | A | | 3/2000 | Hanson |
| 6,211,869 | B1 | | 4/2001 | Loveman et al. |
| 6,353,602 | B1 | * | 3/2002 | Cheng et al. ........... 370/332 |
| 6,424,835 | B1 | | 7/2002 | Shin |
| 6,822,973 | B2 | | 11/2004 | Kelley et al. |
| 2001/0047516 | A1 | | 11/2001 | Swain et al. |
| 2003/0008657 | A1 | * | 1/2003 | Rosen et al. ........... 455/452 |

\* cited by examiner

*Primary Examiner*—Nay Maung
*Assistant Examiner*—Dominic E. Rego

(57) ABSTRACT

The need to decrease paging-related delays in wireless systems (100) is addressed by embodiments herein. A RAN (201) anticipates that an MS (120) is likely to be a target of communication not yet initiated. In one embodiment, a traffic channel is assigned to the MS, when a loading level of a serving cell of the MS is below an assignment threshold. This avoids paging-related delays for the MS should the MS become a target of communication. In another embodiment, the MS is signaled to transition to at least one operational mode in which paging-related delays for the MS are reduced. Such modes include a semi-dormant mode, an unslotted mode, a control hold mode, a speculative scanning mode, and a reduced slot cycle index (RSCI) mode. This allows the MS to begin participating in communication more quickly than it otherwise would, should communication targeting the MS be initiated.

41 Claims, 3 Drawing Sheets

METHOD AND APPARATUS FOR REDUCING PAGING-RELATED DELAYS FOR ANTICIPATED TARGET MOBILE STATIONS

REFERENCE(S) TO RELATED APPLICATION(S)

This application is related to a co-pending application entitled "METHOD AND APPARATUS FOR REDUCING PAGING-RELATED DELAYS", filed on even date herewith, and assigned to the assignee of the present application.

This application is related to a co-pending application entitled "A METHOD FOR SIGNALING BASED ON PAGING CHANNEL LOADING", filed on even date herewith, and assigned to the assignee of the present application.

This application is related to a co-pending application Ser. No. 10/349,728, entitled "A DISPATCH CALL SETUP METHOD", filed Jan. 22, 2003, and assigned to the assignee of the present application.

This application is related to a co-pending application Ser. No. 09/928,129, entitled "METHOD AND APPARATUS TO SHORTEN CALL-SETUP TIME," filed Aug. 10, 2001, which is assigned to the assignee of the present application.

This application is related to a co-pending application Ser. No. 10/413,231, entitled "METHOD AND APPARATUS FOR EFFICIENT CHANNEL ASSIGNMENT," filed Apr. 14, 2003, which is assigned to the assignee of the present application.

This application is related to a co-pending application Ser. No. 10/323,428, entitled "CALL SETUP FOR A MOBILE PACKET DATA DISPATCH NETWORK," filed Dec. 18, 2002, which is assigned to the assignee of the present application.

This application is related to a co-pending application Ser. No. 10/303,255, entitled "A METHOD FOR EXPEDITING TRANSITIONS BETWEEN STATES OF OPERATION IN COMMUNICATIONS EQUIPMENT," filed Nov. 25, 2002, which is assigned to the assignee of the present application.

This application is related to a provisional application, Ser. No. 60/431880, entitled "APPARATUS AND METHOD FOR PERFORMING RADIO ENVIRONMENT REPORTING ON A REVERSE COMMON SIGNALING CHANNEL," filed Dec. 9, 2002.

This application is related to a provisional application, Ser. No. 60/448343, entitled "APPARATUS AND METHOD FOR IMPLEMENTING A REDUCED SLOTTED MODE IN A COMMUNICATION SYSTEM," filed Feb. 18, 2003.

FIELD OF THE INVENTION

The present invention relates generally to wireless communication systems and, in particular, to reducing paging-related delays therein.

BACKGROUND OF THE INVENTION

In wireless communication systems, mobile units or devices operate on batteries. To conserve power, these mobile units go inactive/idle/dormant on the wireless channels after a short period of non-usage. For data services this period is usually 30 to 60 seconds. Therefore, in push-to-talk calls using the wireless data services, both the originating and terminating mobile units must be transitioned to an active state (actually using wireless resources) as part of the call setup prior to enabling the push-to-talk communication. Once a mobile unit is in the active state, a wireless channel has been established and the mobile unit is able to transmit and/or receive data. As known in the art, push-to-talk call applications include transmission of voice and associated signaling data, but advances in packet data networks extend push-to-talk call applications to include images, streaming video, text messaging, stored audio files, and other multimedia.

For typical push-to-talk call applications, the time required for transitioning an originating mobile unit from a dormant/idle state to the active state can be more than 3 seconds in current implementations. An equal or greater amount of time is required to transition the terminating mobile unit from the dormant to active state, including additional time to actually page the mobile device, as is known in the art. These times do not include transmission time over the air or call processing time required by the dispatch controllers. As a result, for the push-to-talk function total delay times experienced by the originating mobile unit may be 8 seconds or greater.

With long call setup times, the advantages of the push-to-talk service as an instant communications method is diminished. In fact, with call setup times of 8 seconds or longer, the service may be non-viable in the marketplace. For instance, users may prefer to simply use cellular, rather than holding down their PTT button.

A similar problem exists for group calls in the push-to-talk mode. Call setup times may be even longer since there are multiple terminating mobile units to connect to the originating mobile unit. Although some of the processing time for each of the terminating or target mobile units may overlap, the total call setup time is even greater than the individual-to-individual call. Therefore, group calls pose an even greater problem for the push-to-talk function in a packet data network.

As previously mentioned, paging the mobile units involves significant delay. The radio access network (RAN) may need to first locate the MS using a page/page response exchange, which typically takes 400+ ms. Also, when a base transceiver station (BTS) attempts to page a mobile, it must wait for the appropriate paging channel (PCH) slot to send a message to the MS operating in slotted mode. This is known as the "slot cycle delay," which can be up to 5.12 seconds for a Slot Cycle Index (SCI) value of 2. In addition, page messages can be dropped during periods of high PCH loading. Typically, the recovery mechanism is for the source of the message to resend after a lengthy timeout. Moreover, some of these paging-related delays impact other instant messaging services in addition to PTT, such as short message service (SMS).

Accordingly, it would be highly desirable to have a method and apparatus for substantially decreasing paging-related delays in wireless systems.

DETAILED DESCRIPTION OF EMBODIMENTS

The need to decrease paging-related delays in wireless systems is addressed by embodiments herein. A RAN anticipates that an MS is likely to be a target of communication not yet initiated. In one embodiment, a traffic channel is assigned to the MS, when a loading level of a serving cell of the MS is below an assignment threshold. This avoids paging-related delays for the MS should the MS become a target of communication. In another embodiment, the MS is signaled to transition to at least one operational mode in which paging-related delays for the MS are reduced. Such modes include a semi-dormant mode, an unslotted mode, a control hold mode, a speculative scanning mode, and a reduced slot cycle index (RSCI) mode. This allows the MS to begin participating in communication more quickly than it otherwise would, should communication targeting the MS be initiated.

Figure 1:
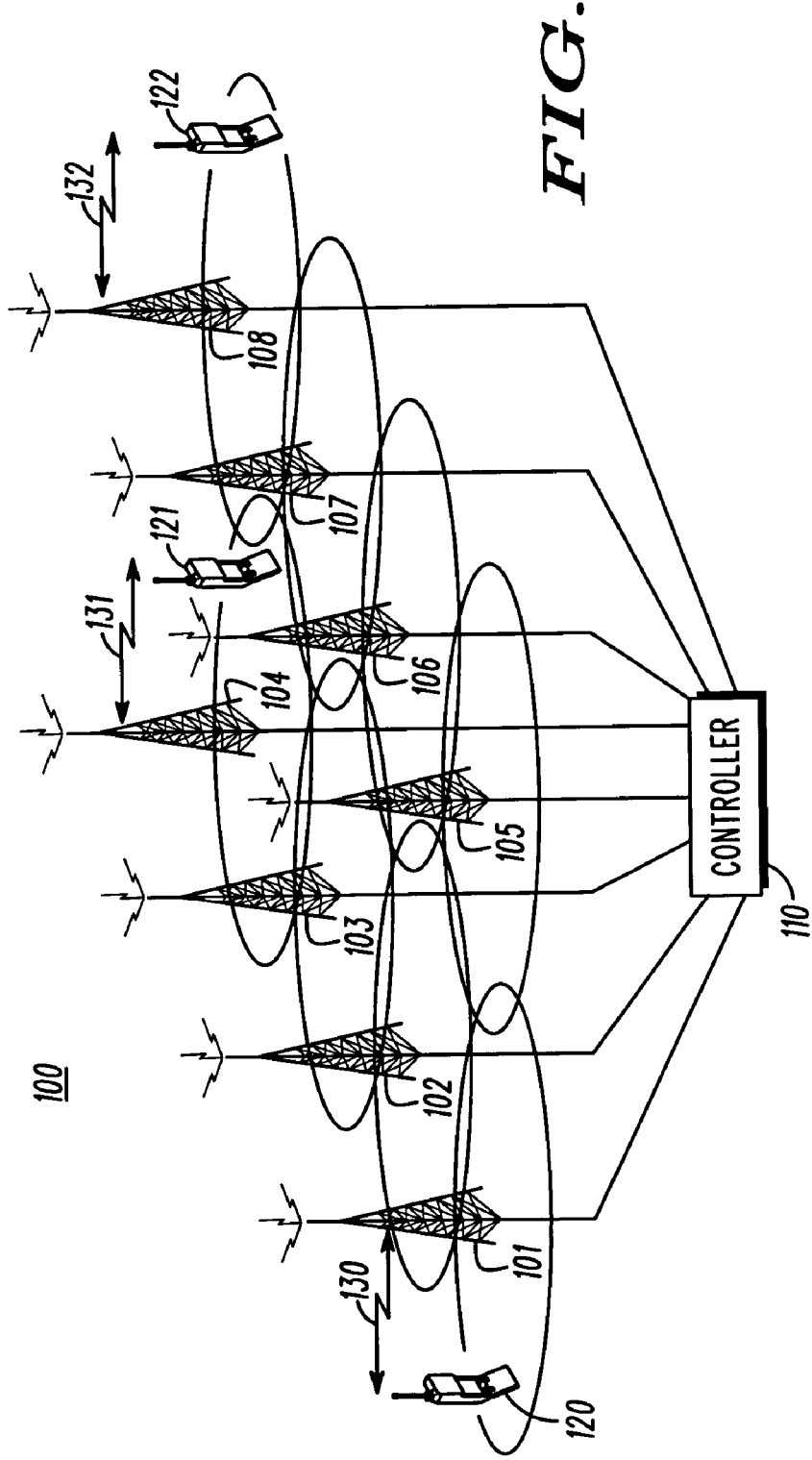
FIG. 1 is a depiction of a communication system in accordance with embodiments of the present invention.
Figure 2:
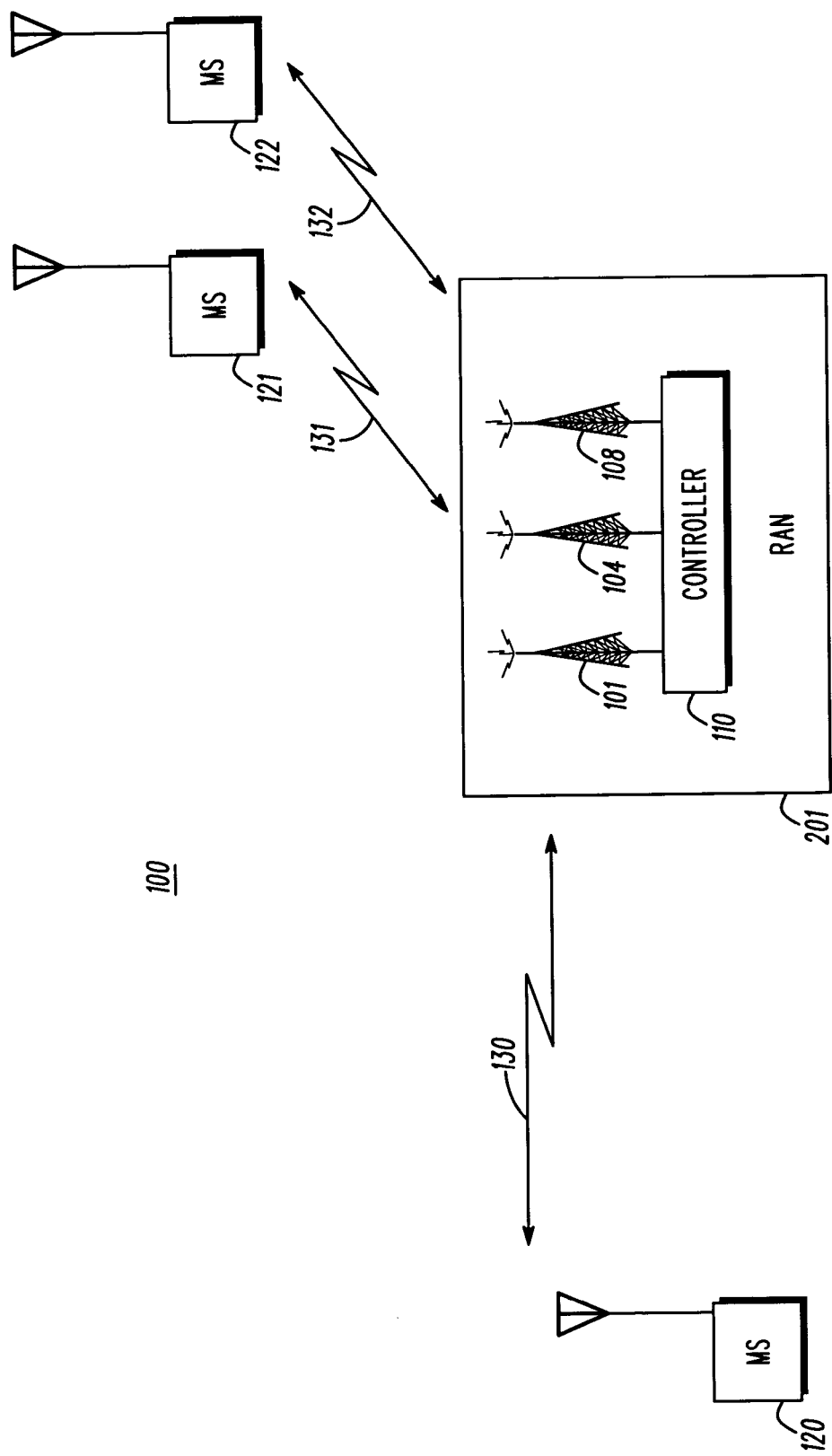
FIG. 2 is a block diagram depiction of a communication system in accordance with embodiments of the present invention.
Figure 3:
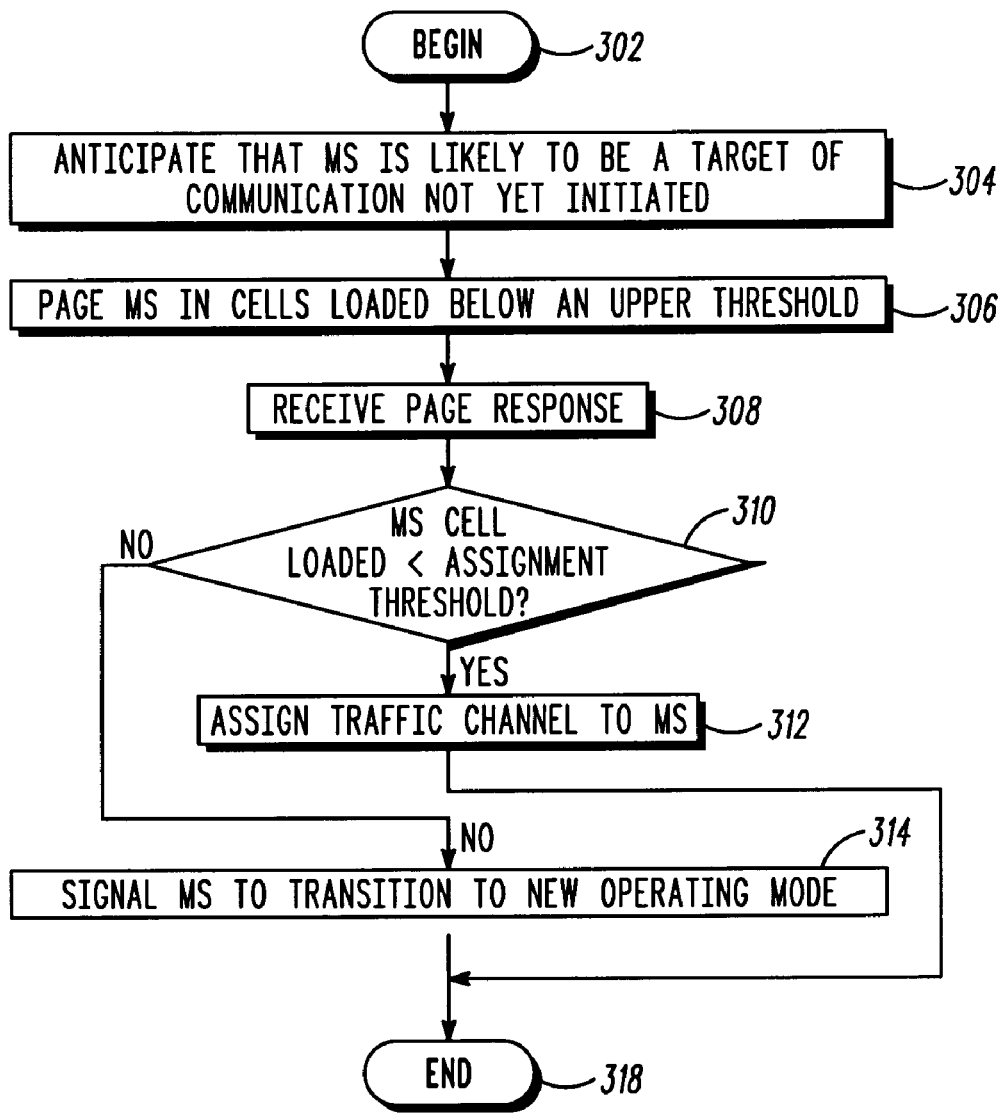
FIG. 3 is a logic flow diagram of functionality performed by a RAN in accordance with an embodiment of the present invention.

The disclosed embodiments can be more fully understood with reference to FIGS. 1-3. FIG. 1 is a depiction of communication system 100 in accordance with a first embodiment of the present invention. Communication system 100 is a well-known Code Division Multiple Access (CDMA) system, specifically a CDMA 2000 system, which is based on the Telecommunications Industry Association/Electronic Industries Association (TIA/EIA) standard IS-2000, suitably modified to implement the present invention. (The TIA/EIA can be contacted at 2001 Pennsylvania Ave. NW, Wash., D.C. 20006). Alternative embodiments of the present invention may be implemented in communication systems that employ other technologies such as WCDMA, HRPD, "iDEN," "WiDEN," GSM, GPRS, UMTS, and EDGE.

Referring to FIGS. 1 and 2, the first embodiment of the present invention includes radio access network (RAN) 201 and mobile stations (MSs) 120-122. Although depicted as mobile phones, MSs in the present invention are not limited to mobile phones. For example, an MS may comprise all manner of devices wirelessly connected to the radio access network such as computers, personal data assistants (PDAs), gaming devices, etc.

Those skilled in the art will recognize that FIGS. 1 and 2 do not depict all of the network equipment necessary for system 100 to operate but only those system components and logical entities particularly relevant to the description of embodiments of the present invention. For example, RAN 201 comprises well-known components such as wireless transceiver equipment 101-108 supporting signaling transmission and reception for each cell, i.e., wireless coverage area. Since a wireless coverage area may refer to a cell or a sector of a cell, depending on the particular implementation, the term "cell" (or "cell-site") will be understood by those skilled in the art to refer to an individual sector within those cells that contain multiple sectors.

RAN 201 also comprises communications controller 110. Those skilled in the art are aware of the many ways each of these RAN entities can be implemented and/or purchased from wireless communications companies such as "MOTOROLA." Controllers, for example, typically comprise components such as processors, memory, and/or logic circuitry designed to implement algorithms that have been expressed as computer instructions and/or in circuitry. Given an algorithm or a logic flow, those skilled in the art are aware of the many design and development techniques available to implement a controller that performs the logic.

In some embodiments of the present invention, RAN wireless transceiver equipment is included within components such as RAN base transceiver stations (BTSs), while RAN communications controllers are implemented in a distributed fashion across components that include base site controllers (BSCs) and the BTSs. Although not shown, BSCs are known to interface with other RAN equipment such as mobile switching centers/virtual location registers (MSC/NLR), home location registers (HLR), etc. In a first and second embodiment of the present invention, a known CDMA 2000 RAN is adapted using known telecommunications design and development techniques to implement the RAN aspect of the present invention. The result is RAN 201, which performs the method described with respect to FIG. 3. Those skilled in the art will recognize that the RAN aspect of the present invention may be implemented in and across various physical components of system 100, including those not illustrated in FIG. 1.

RAN 201 communicates with MSs 120-122 via CDMA 2000 air interface resources 130-132. Resources 130-132 each comprises a variety of well-known channel types, such as access channels, paging channels, and traffic channels. Some of these channels, such as traffic channels, are dynamically assigned and de-assigned to provide user services as requested and according well-known techniques and standards.

MSs 120-122 comprise components such as processors (e.g., memory and processing devices), receivers, and transmitters. Transmitters, receivers, and processors as used in CDMA MSs are all well-known in the art. This common set of MS components is adapted using known telecommunications design and development techniques to implement the wireless unit aspect of the present invention.

Operation of communication system 100 in accordance with the first embodiment of the present invention occurs substantially as follows. Controller 110 of RAN 201 anticipates that MS 120 is likely to be a target of communication not yet initiated. When controller 110 determines that a loading level of a serving cell of MS 120 is below an assignment threshold, controller 110 assigns a traffic channel to MS 120 to avoid paging-related delays for MS 120 in the case that MS 120 becomes a target of communication.

Anticipating that MS 120 is likely to be a target of communication not yet initiated involves controller 110 receiving any of a variety of indications. For example, controller 110 may receive an indication that MS 120 is newly available to a group of associated communication devices. An example of this is when MSs 121 and 122 designate MS 120 as one of their messaging buddies. The period after MS 120 becomes newly available is a period of likely messaging between MSs 120-122. To announce its availability, such as after powering up or completing a call, Ms 120 may send a presence update to controller 110 indicating that its presence state has changed. In alternative embodiments, controller 110 may anticipate that MS 120 is likely to be a target of communication when there are a threshold number of communication devices that designate the mobile as one of their messaging buddies or that there are a threshold number (or a threshold percentage) of these communication devices that are also available while the mobile is newly available. Controller 110 may also anticipate that MS 120 is likely to be a target of communication when controller 110 receives a presence query for MS 120, receives a presence state update from the MS indicating that the MS is no longer in an offline (i.e., unavailable) presence state, receives an indication that a buddy of MS 120 (e.g., units that MS 120 has designated as its buddies) has become newly available (such as when powering up), receives an indication that a message addressed to MS 120 is being composed, receives an indication that an address book listing associated with MS 120 has been recently accessed, or receives an indication that MS 120 requires an emergency responder status in order to quickly participate in emergency-related communication.

In addition to those indications discussed above, controller 110 may anticipate that MS 120 is likely to be a target of communication when controller 110 receives an indication that messaging associated with MS 120 has been recently accessed or receives an indication that the MS is in an active messaging mode. Messaging associated with the MS includes messaging such as data burst messaging (DBM), short data burst (SDB) messaging, short message service (SMS) messaging, voice mail messaging, e-mail messaging, presence messaging, and Caller ID messaging. For example, another device reading or selecting such messaging (whether originated by MS 120 or also received by MS 120) may cause controller 110 to anticipate that MS 120 is likely to be a target of communication. Similarly, an indication that MS 120 is in an active messaging mode includes recent messaging such as data burst messaging received from/for MS 120, SMS messaging received from/for MS 120, SDB messaging received from/for MS 120, broadcast programming request messaging received from MS 120, voice mail notification messaging received for MS 120, and email notification messaging received for MS 120.

In the first embodiment, when controller 110 anticipates that MS 120 is a likely target, controller 110 pages MS 120 via the wireless transceiver equipment supporting those cells with a loading level that is below an assignment threshold. The loading level may be the loading level of a paging channel or a traffic channel loading level. Defining how the loading level will represent the actual loading of a cell and accordingly setting an effective assignment threshold can be done in a variety of ways by system designers. In one embodiment of the present invention, the loading level may, for example, be the percentage of traffic channel capacity currently being used in the cell or a moving average thereof, while the assignment threshold could then be set to a value such as 90% or tuned to achieve optimal system performance for a given system. Also, since MS 120 is being paged as an anticipated target of communication, rather than an actual target, RAN 201 may page MS 120 in a manner that gives higher paging priority to pages for MSs to which communication has already been initiated. For example, MS 120 pages may be queued as lower priority pages relative to other pages.

Assuming wireless transceiver equipment 101 pages MS 120, controller 110 is likely to receive a page response for MS 120. After receiving the page response, controller 110 assigns a traffic channel to MS 120 in its serving cell. In alternative embodiments to the present invention, a traffic channel may not be assigned if RF conditions are not sufficiently favorable. For example, a traffic channel may only be assigned when the page response indicates that the signal strength of MS 120 is above a signal strength threshold or when the page response indicates that the number of MS signaling legs is below a certain number of legs, such as 2.

In the first embodiment, if MS 120 is in a cell that has a loading level above the assignment threshold, it will not get assigned a traffic channel since it is only anticipated to be a target of communication. Instead however, controller 110 may signal MS 120 to transition to at least one operational mode in which paging-related delays for the MS are reduced. Controller 110 performs such signaling when MS 120 is in a cell that has a loading level between the assignment threshold and an upper threshold. Alternatively, controller 110 may perform this signaling as part of paging MS 120. In this case, cells having a loading level between the assignment threshold and the upper threshold will page MS 120, indicating that MS 120 should transition to one or more operational modes in which paging-related delays for the MS are reduced.

In the second embodiment of the present invention, controller 110 anticipates that MS 120 is likely to be a target of communication not yet initiated. In contrast to the first embodiment, controller 110 then signals MS 120 via wireless transceiver equipment 101 to transition to at least one operational mode in which paging-related delays for the MS are reduced. These operational modes include, for example, semi-dormant mode, unslotted mode, control hold mode, speculative scanning mode, and reduced slot cycle index (RSCI) mode.

In semi-dormant mode, the MS performs periodic location updates. More specifically, the MS sends radio environment reports on its access channel so that the RAN can keep track of the MS's location and strong pilots. Thus, semi-dormant mode allows paging of the mobile without the page/page response cycle delay. In RSCI mode, the MS's slot cycle index is reduced (e.g., from SCI 2 to SCI 0). Thus, the MS checks its paging channel more often, reducing the paging channel latency delay for the MS. Lastly, speculative scanning mode is described in detail in co-pending application Ser. No. 10/349,728, entitled "A DISPATCH CALL SETUP METHOD", filed Jan. 22, 2003, and assigned to the assignee of the present application.

In addition, controller 110 may signal MS 120 to transition to one or more operational modes for a particular period of time. For example, MS 120 may be signaled to transition to the RSCI mode for a particular period of time or the semi-dormant mode for a particular period of time or maximum number of reports. Controller 110 might also receive an indication from MS 120 that its remaining battery life is short. To conserve MS 120's battery, then, controller 110 may limit the potential delay-saving modes to RSCI.

Because these delay-saving modes can result in increased cell loading, controller 110 signals MS 120 to transition to a new operational mode when a cell loading level is below an upper threshold. In the second embodiment, this loading level is the paging channel loading level of the serving cell. Again, as discussed above and as is applicable throughout the present description, defining how a particular loading level will represent the actual loading of a cell and accordingly setting an effective threshold can be done in a variety of ways by system designers. In one embodiment of the present invention, the paging channel loading level may, for example, be the percentage of paging channel capacity currently being used in the cell or a moving average thereof, while the upper threshold could then be set to a value such as 95% or tuned to achieve optimal system performance for a given system.

In an embodiment combining the first and second embodiments, controller 110 signals MS 120 to transition to a new operational mode when a cell loading level is between the assignment threshold and the upper threshold. Thus, if MS 120 is in a cell with loading below the assignment threshold, a traffic channel is assigned. If instead, MS 120 is in a cell with loading between the assignment threshold and the upper threshold, it is signaled to transition to a delay-saving operational mode.

Controller 110 may signal MS 120 to transition to one or more delay-saving modes, based upon MS 120's situation. As mentioned above, RSCI is favored when MS 120 has a low battery. Semi-dormant is favored when MS 120 is relatively stationary, such as indicated by its idle handoff rate, or if MS 120's paging channel loading is relatively light. In one alternative embodiment, the loading range between the assignment threshold and the upper threshold can be subdivided into three groups, a high load group, a medium load group, and a low load group. In this embodiment, MS 120 may be signaled to transition to RSCI, semi-dormant mode, and control hold mode, when in a cell in the high, medium, and low load groups, respectively.

FIG. 3 is a logic flow diagram of functionality performed by a RAN in accordance with one embodiment of the present invention. Logic flow 300 begins (302) when the RAN anticipates (304) that an MS is likely to be a target of communication that has not yet been initiated. The RAN pages the MS as it would ordinarily do according to its paging algorithm, except that the RAN only pages (306) in those cells that have loading levels below an upper threshold. When the RAN receives (308) a page response, it either (310) assigns (312) a traffic channel to the MS or it signals (314) the MS to transition to a delay-saving mode based upon whether the serving cell of the MS has a loading level below an assignment threshold. Hence, when the MS is in a cell with a loading level between the upper threshold and an assignment threshold, the RAN signals it to transition to a delay-saving mode. Logic flow 300 thus ends (316).

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity, and have not necessarily been drawn to scale. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language).

What is claimed is:

1. A method of reducing paging-related delays for anticipated target mobile stations (MS), the method comprising:
    anticipating by a radio access network (RAN) that an MS is likely to be a target of communication not yet initiated;
    performing at least one of:
        when a loading level of a serving cell of the MS is below an assignment threshold, assigning a traffic channel to the MS to avoid paging-related delays for the MS should the MS become a target of communication and
        signaling the MS to transition to at least one operational mode in which a period of paging-related delay for the MS is reduced, wherein the at least one operational mode comprises at least one MS mode from the group consisting of a semi-dormant mode, an unslotted mode, a control hold mode, a speculative scanning mode, and a reduced slot cycle index (RSCI) mode.

2. The method of claim 1, wherein the loading level of the serving cell comprises a traffic channel loading level of the serving cell.

3. The method of claim 1, further comprising:
    paging the MS in cells that have a loading level below the assignment threshold.

4. The method of claim 3, wherein paging the MS comprises paging the MS in a manner that gives higher paging priority to pages for MSs for which communication has already been initiated.

5. The method of claim 3, further comprising:
    receiving a page response from the MS that indicates an MS signal strength;
    assigning a traffic channel to the MS when the MS signal strength is above a signal strength threshold, even though communication targeting the MS has not been initiated yet.

6. The method of claim 3, further comprising:
    receiving a page response from the MS that indicates a number of MS signaling legs;
    assigning a traffic channel to the MS when the number of MS signaling legs is below a signaling-leg threshold, even though communication targeting the MS has not been initiated yet.

7. The method of claim 1, further comprising:
    signaling the MS in at least one cell that has a loading level between the assignment threshold and an upper threshold to transition to at least one operational mode in which paging-related delays for the MS are reduced.

8. The method of claim 7, wherein the at least one operational mode comprises MS modes from the group consisting of a semi-dormant mode, an unslotted mode, a control hold mode, a speculative scanning mode, and a reduced slot cycle index (RSCI) mode, wherein the MS performs periodic location updates in the semi-dormant mode.

9. The method of claim 1, wherein anticipating that an MS is likely to be a target of communication not yet initiated comprises receiving an indication from the group consisting of an indication that the MS is newly available to a group of associated communication devices wherein each of the group of associated communication devices is related to the MS as a messaging buddy, a presence query for the MS, a presence state update from the MS indicating that the MS is no longer in an offline presence state, an indication that a buddy of MS has become newly available, an indication that a message addressed to the MS is being composed, an indication that an address book listing associated with the MS has been recently accessed, an indication that messaging associated with the MS has been recently accessed, an indication that the MS requires emergency responder status, and an indication that the MS is in an active messaging mode.

10. The method of claim 9, wherein the messaging associated with the MS comprises messaging from the group consisting of data burst messaging (DBM), short data burst (SDB) messaging, short message service (SMS) messaging, voice mail messaging, e-mail messaging, presence messaging, and Caller ID messaging.

11. The method of claim 9, wherein the indication that the MS is in an active messaging mode comprises recent messaging from the MS from the group consisting of data burst messaging, short message service (SMS) messaging, short data burst (SDB) messaging, and broadcast programming request messaging, wherein the indication that the MS is in an active messaging mode comprises recent messaging for the MS from the group consisting of data burst messaging, SMS messaging, SDB messaging, voice mail notification messaging, and email notification messaging.

12. The method of claim 1, wherein signaling the MS comprises:
in at least one cell in which a loading level is below an upper threshold, signaling the MS to transition to at least one operational mode in which paging-related delays for the MS are reduced.

13. The method of claim 12, wherein the loading level comprises a paging channel loading level of the serving cell.

14. The method of claim 12, wherein signaling the MS comprises:
signaling the MS in at least one cell that has a loading level between an assignment threshold and the upper threshold to transition to at least one operational mode in which paging-related delays for the MS are reduced.

15. The method of claim 14, wherein cells that have a loading level between the assignment threshold and the upper threshold associated with one of three groups according to their individual loading levels, a high load group, a medium load group, and a low load group, and wherein signaling comprises:
signaling the MS in at least one cell in the high load group to transition to a reduced slot cycle index (RSCI) mode;
signaling the MS in at least one cell in the medium load group to transition to a semi-dormant mode, wherein the MS performs periodic location updates in the semi-dormant mode;
signaling the MS in at least one cell in the low load group to transition to a control hold mode.

16. The method of claim 12, further comprising:
when no response to previous signaling is received, signaling the MS, in at least one cell in which a loading level is above the upper threshold, to transition to at least one operational mode in which paging-related delays for the MS are reduced.

17. The method of claim 16, further comprising:
when no response to previous signaling is received, signaling the MS, in at least one cell in which the MS has not yet been signaled, to transition to at least one operational mode in which paging-related delays for the MS are reduced.

18. The method of claim 1, wherein signaling the MS comprises signaling the MS in a manner that gives higher signaling priority to MSs for which communication has already been initiated.

19. The method of claim 1, wherein anticipating that an MS is likely to be a target of communication not yet initiated comprises receiving an indication from the group consisting of an indication that the MS is newly available to a group of associated communication devices wherein each of the group of associated communication devices is related to the MS as a messaging buddy, a presence query for the MS, a presence state update from the MS indicating that the MS is no longer in an offline presence state, an indication that a buddy of MS has become newly available, an indication that a message addressed to the MS is being composed, an indication that an address book listing associated with the MS has been recently accessed, an indication that messaging associated with the MS has been recently accessed, an indication that the MS requires emergency responder status, and an indication that the MS is in an active messaging mode.

20. The method of claim 19, wherein the messaging associated with the MS comprises messaging from the group consisting of data burst messaging (DBM), short data burst (SDB) messaging, short message service (SMS) messaging, voice mail messaging, e-mail messaging, presence messaging, and Caller ID messaging.

21. The method of claim 19, wherein the indication that the MS is in an active messaging mode comprises recent messaging from the MS from the group consisting of data burst messaging, short message service (SMS) messaging, short data burst (SDB) messaging, and broadcast programming request messaging, wherein the indication that the MS is in an active messaging mode comprises recent messaging for the MS from the group consisting of data burst messaging, SMS messaging, SDB messaging, voice mail notification messaging, and email notification messaging.

22. The method of claim 19, wherein the group of associated communication devices includes a threshold number of members.

23. The method of claim 19, wherein the group of associated communication devices includes a threshold number of available members.

24. The method of claim 19, wherein the group of associated communication devices includes a threshold percentage of available members.

25. The method of claim 1, wherein the MS performs periodic location updates in the semi-dormant mode.

26. The method of claim 25, wherein signaling the MS comprises signaling the MS to transition to the at least one operation mode for a particular period of time.

27. The method of claim 25, wherein signaling the MS comprises signaling the MS to transition to the semi-dormant mode for a maximum number of reports.

28. The method of claim 1, further comprising:
receiving an indication from the MS that MS battery life is low, wherein the at least one operational mode in which paging-related delays for the MS are reduced is limited to a reduced slot index mode (RSCI).

29. A radio access network (RAN) comprising:
wireless transceiver equipment adapted to support signaling transmission and reception for each cell of a plurality of cells;
a communications controller, communicatively coupled to the wireless transceiver equipment for each cell of the plurality of cells,
adapted to anticipate that a mobile station (MS) is likely to be a target of communication not yet initiated,
adapted to perform at least one of
assigning, when a loading level of a serving cell of the MS is below an assignment threshold, a traffic channel to the MS to avoid paging-related delays for the MS should the MS become a target of communication and
signaling the MS to transition to at least one operational mode in which a period of paging-related delay for the MS is reduced, wherein the at least one operational mode comprises at least one MS mode from the group consisting of a semi-dormant mode, an unslotted mode, a control hold mode, a speculative scanning mode, and a reduced slot cycle index (RSCI) mode.

30. The RAN of claim 29, wherein the communications controller is further adapted to page the MS in cells that have a loading level below the assignment threshold.

31. The RAN of claim 29, wherein the communications controller is further adapted to signal the MS in at least one cell that has a loading level between the assignment threshold and an upper threshold to transition to at least one operational mode in which paging-related delays for the MS are reduced.

32. The RAN of claim 29, wherein anticipating by the communications controller that an MS is likely to be a target of communication not yet initiated comprises receiving an indication from the group consisting of an indication that the MS is newly available to a group of associated communication devices wherein each of the group of associated communication devices is related to the MS as a messaging buddy, a presence query for the MS, a presence state update from the MS indicating that the MS is no longer in an offline presence state, an indication that a buddy of MS has become newly available, an indication that a message addressed to the MS is being composed, an indication that an address book listing associated with the MS has been recently accessed, an indication that messaging associated with the MS has been recently accessed, an indication that the MS requires emergency responder status, and an indication that the MS is in an active messaging mode.

33. The RAN of claim 32, wherein the messaging associated with the MS comprises messaging from the group consisting of data burst messaging (DBM), short data burst (SDB) messaging, short message service (SMS) messaging, voice mail messaging, e-mail messaging, presence messaging, and Caller ID messaging.

34. The RAN of claim 32, wherein the indication that the MS is in an active messaging mode comprises recent messaging from the MS from the group consisting of data burst messaging, short message service (SMS) messaging, short data burst (SDB) messaging, and broadcast programming request messaging, wherein the indication that the MS is in an active messaging mode comprises recent messaging for the MS from the group consisting of data burst messaging, SMS messaging, SDB messaging, voice mail notification messaging, and email notification messaging.

35. The RAN of claim 29, wherein the MS performs periodic location updates in the Semi-dormant mode.

36. The RAN of claim 29, wherein signaling the MS comprises:
in at least one cell in which a loading level is below an upper threshold, signaling the MS to transition to at least one operational mode in which paging-related delays for the MS are reduced.

37. The RAN of claim 36, wherein signaling the MS comprises:
signaling the MS in at least one cell that has a loading level between an assignment threshold and the upper threshold to transition to at least one operational mode in which paging-related delays for the MS are reduced.

38. The RAN of claim 29, wherein anticipating that an MS is likely to be a target of communication not yet initiated comprises receiving an indication from the group consisting of an indication that the MS is newly available to a group of associated communication devices wherein each of the group of associated communication devices is related to the MS as a messaging buddy, a presence query for the MS, a presence state update from the MS indicating that the MS is no longer in an offline presence state, an indication that a buddy of MS has become newly available, an indication that a message addressed to the MS is being composed, an indication that an address book listing associated with the MS has been recently accessed, an indication that messaging associated with the MS has been recently accessed, an indication that the MS requires emergency responder status, and an indication that the MS is in an active messaging mode.

39. The RAN of claim 38, wherein the messaging associated with the MS comprises messaging from the group consisting of data burst messaging (DBM), short data burst (SDB) messaging, short message service (SMS) messaging, voice mail messaging, e-mail messaging, presence messaging, and Caller ID messaging.

40. The RAN of claim 38, wherein the indication that the MS is in an active messaging mode comprises recent messaging from the MS from the group consisting of data burst messaging, short message service (SMS) messaging, short data burst (SDB) messaging, and broadcast programming request messaging, wherein the indication that the MS is in an active messaging mode comprises recent messaging for the MS from the group consisting of data burst messaging, SMS messaging, SDB messaging, voice mail notification messaging, and email notification messaging.

41. The RAN of claim 29, wherein the at least one operational mode comprises MS modes from the group consisting of a semi-dormant mode, an unslotted mode, a control hold mode, a speculative scanning mode, and a reduced slot cycle index (RSCI) mode, wherein the MS performs periodic location updates in the semi-dormant mode.

* * * * *